April 23, 1968 V. VODICKA 3,379,174
APPARATUS FOR APPLYING A COATING ONTO A LOCALIZED REGION
OF THE INSIDE OF A HOLLOW ARTICLE
Filed April 1, 1964
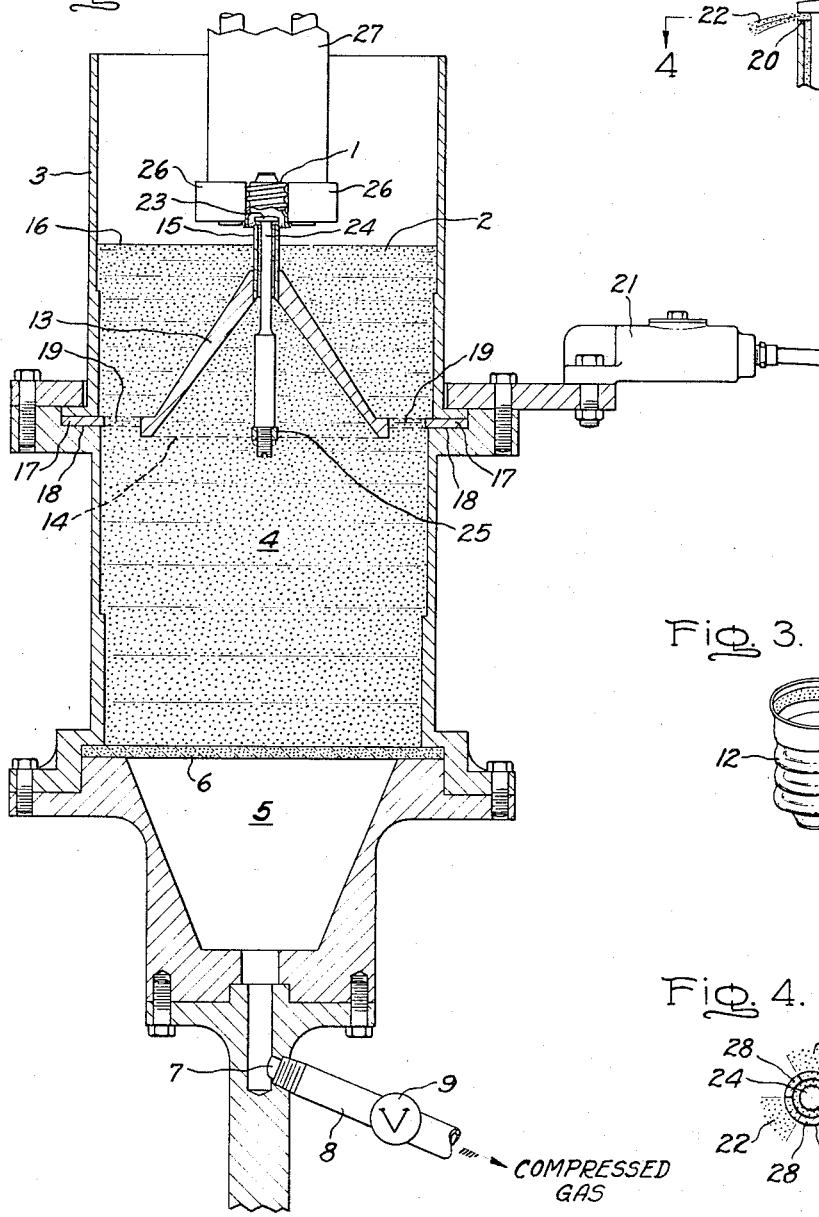
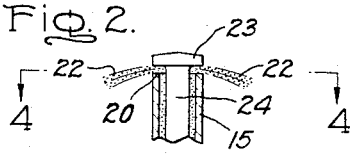
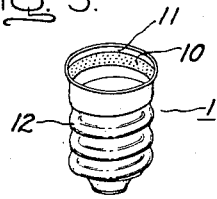
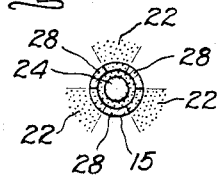
Inventor:
Vincent Vodicka
by James J. Lazne
His Attorney

United States Patent Office 3,379,174
Patented Apr. 23, 1968

3,379,174
APPARATUS FOR APPLYING A COATING ONTO A LOCALIZED REGION OF THE INSIDE OF A HOLLOW ARTICLE
Vincent Vodicka, South Euclid, Ohio, assignor to General Electric Company, a corporation of New York
Filed Apr. 1, 1964, Ser. No. 356,552
7 Claims. (Cl. 118—318)

ABSTRACT OF THE DISCLOSURE

Apparatus for applying a coating of powdered resin onto a localized region of the inside wall of a hollow article having an open end, by levitation of the powdered resin from a fluidized bed thereof, has a funnel-shaped applicator nozzle positioned with its funnel mouth end facing downwardly and immersed in the fluidized powder bed and its upper nozzle-spout end projecting above the top surface of the powder bed. Holder means support the hollow article with its open end down and positioned over the upper nozzle-spout end of the applicator nozzle, and a deflector cap member overlies the open upper nozzle-spout end of the applicator nozzle to intercept the coating particles issuing upwardly therefrom and redirect them laterally outward of the nozzle end onto localized regions of the hollow heated article.

---

This invention relates in general to a method and apparatus for coating selected localized areas of the inside walls or rims of tubular articles with powdered coating material. The invention is of particular utility for the application of a ring, or one or more ring segments, of powdered epoxy resin or other type resin basing cement to the inside rim of a lamp base or similar tubular article.

Electric lamp bases are generally secured to the glass envelope or bulb of the lamp by means of a so-called basing cement. The conventional cement heretofore employed for this purpose has comprised a paste-like mixture customarily composed of an inert mineral filler such as marble flour, an insulating binder such as a thermosetting synthetic resin comprising a phenolic-aldehydic condensate product (such as Durite or Bakelite), one or more natural resins such as resin and shellac, and a processing agent or solvent such as alcohol. It is common practice to also add to the cement a small amount of a curing indicator material, for example, an organic dye such as malachite green which changes color upon heating, the amount of color change serving to indicate the degree of heat applied to the cement during the curing process. The basing cement is customarily applied to the tubular lamp base in the form of a ring around the inside rim thereof, where the base normally engages with the glass bulb of the lamp. The outer side of the tubular base, and that portion of its inner side other than the inside rim thereof, is desirably kept free of any basing cement.

While such conventional phenolic resin type basing cements have in general proven entirely satisfactory in the past in respect to performance characteristics such as their bonding strength and their adaptability to high speed production manufacture of electric lamps, there nevertheless is a continuing desire to not only improve the performance characteristics of basing cements and achieve cost reductions therein, but to also better adapt them to automated production procedures and ever increasing lamp production speeds. It has been found that basing cements composed essentially of an epoxy resin possess, among other things, higher bonding or torsion strength and longer shelf life over that possessed by conventional phenolic resin type basing cements, and that they will withstand severe humid conditions without any loss in bond strength. In addition, because they can be formulated entirely from dry powder materials, such epoxy resin type basing cements can be prepared by a simplified and less expensive manufacturing procedure. However, due to the inherent gummy or sticky nature of such epoxy resin powder materials, difficulty has been encountered in adapting the use of such epoxy resin basing cements to modern high speed lamp production procedures, the epoxy powders tending to build up on those areas of the coating applicator device where friction contact occurs such as then interferes with the proper operation of the device. For this reason alone, the use of mechanically operating devices involving moving parts is precluded in automatic coating equipment for applying a coating of the epoxy resin cement to selected areas of an article as, for example, a ring or segmented ring of the cement on the inside wall of a tubular article such as a lamp base.

It in an object of my invention, therefore, to provide automatically operating coating apparatus simple in construction and effective in operation for applying uniform coatings of pulverulent material to selected localized areas of the inside wall of tubular or other hollow articles at high speed.

Another object of my invention is to provide automatically operating coating apparatus devoid of moving parts for applying rings or ring segments of pulverulent coating material such as powdered epoxy resin to the inside rims of tubular articles such as lamp bases at high operating speed.

Still another object of my invention is to provide a novel method of coating selective localized areas of the inside wall of hollow articles with pulverulent coating material.

A further object of my invention is to provide an effective method of applying a ring, or one or more ring segments, of powdered epoxy resin basing cement to the inside rim of a lamp base.

Briefly stated, in accordance with one aspect of the invention, a funnel-shaped coating applicator nozzle is disposed in an inverted position with its lower funnel-mouth end immersed in a bed of pulverulent fusible coating material and its upper nozzle-spout end projecting upwardly above the top surface thereof. The bed of pulverulent coating material is then fluidized by passage of pressurized gas or air upwardly therethrough, directed upwardly through a porous bed plate on which the powder bed rests, to thereby cause a flow of the pulverulent coating material upwardly from the fluidized bed through the coating applicator nozzle and out its upper nozzle-spout end to form a continuously overflowing annular or segmented umbrella-like stream of the coating particles issuing radially outward therefrom. The tubular article to be coated, while preheated to a temperature above the melting or sintering temperature of the pulverulent coating material, is then placed over the upper nozzle-spout end of the coating applicator nozzle to cause the umbrella-like flow of coating particles issuing radially outward therefrom to impinge against the inside heated wall of the article and become instantaneously heated thereby and sintered or fused in place thereonto. To assure uniformity of powder flow upwardly through the coating applicator nozzle, the bed of pulverulent coating material preferably is continuously agitated during the coating operation by imparting high frequency vibratory movement to the container therefor, as by means of conventional type vibrator motor means.

In accordance with a further aspect of the invention, an umbrella-like shield or deflector may be positioned over, but spaced a slight distance above, the upper nozzle-spout end of the coating applicator nozzle in order to thereby insure the redirecting or deflection of the coating particles radially outward therefrom as they issue from its upper end. The coating particles are thereby prevented from continuing in their upward path as they issue from the upper nozzle-spout end of the coating applicator nozzle and thereby depositing on undesired upper areas of the inside wall of the hollow article to be coated.

Further objects and advantages of the invention will appear from the following detailed description of a species thereof and from the accompanying drawing.

In the drawing, FIG. 1 is a vertical section of coating apparatus comprising my invention.

FIG. 2 is a fragmentary sectional view, on an enlarged scale, of the upper nozzle-spout end of the upper applicator nozzle of the coating apparatus.

FIG. 3 is a perspective view of a lamp base showing the ring-like coating of powdered resin basing cement applied thereto by the method and apparatus according to the invention, and FIG. 4 is a horizontal section on an enlarged scale, taken on a plane corresponding to the line 4—4 of FIG. 2, of a modified form of the upper nozzle-spout end of the coating applicator nozzle.

In carrying out the coating process according to the invention, the powdered epoxy resin basing cement or other pulverulent coating material which is to be applied to the inside wall of the lamp base 1 or other tubular article, is transformed into a continuously fluidized powder bed 2 in the well known manner by passing a gaseous fluid under pressure upwardly through the powder bed in finely divided streams, as disclosed, for example, in Gemmer U.S. Patents 2,844,489, dated July 22, 1958; 2,974,059, dated Mar. 7, 1961; and 3,090,696, dated May 21, 1963, the powder bed being maintained in the fluidized state by controlling the flow of the gas. For such purpose, the bed 2 of pulverulent coating material is contained within a suitable open top tank or container 3 (FIG. 1) which is divided or partitioned into upper and lower chambers 4 and 5, respectively, by a horizontally disposed porous or gas-pervious plate or partition 6 through which the pressurized gas or air is passed upwardly. The porous plate or partition 6, which should be pervious to the gas used but impervious to the particles of coating material, may preferably take the form of a porous ceramic plate, although other similar structures may be advantageously used. One form of porous plate structure 6 which may be suitably employed is composed of an Alundum refractory material formed of fused alumina grains bonded together with an aluminous glass at a high firing temperature, as described in the above-mentioned Gemmer patents.

The container 3 is provided with a gas inlet opening 7 into its lower chamber 5 which opening 7 is adapted for connection through a conduit or pipe 8 and a shut-off valve 9 therein to a suitable source of gas or air under pressure in order to pressurize the lower or pressure chamber 5. The source of gas under pressure is not shown since it may consist of any conventional source such as a steel "bottle" of precompressed gas or, if air is to be used, a conventional air compresser and accumulation tank may be employed. When air is to be used, it is also possible to attach an air blower or pump directly to the inlet conduit 8.

In the practice of the process of the invention, a quantity of the very finely divided free-flowing dry coating material, in this case powdered epoxy resin basing cement, is placed in the upper chamber 4 of the container 3 to form the powder bed 2, and gas or air under pressure is admitted into the lower pressure chamber 5 through the conduit or pipe 8 and the valve 9. The gas from the lower chamber 5 passes through the gas-pervious partition 6 and flows upwardly through many finely divided streams, or in what might be characterized as a parallel upward flow from the entire upper surface of the partition 6, through the finely divided or pulverulent coating material 2. This upwardly moving gas causes the individual particles in the bed 2 of coating material to become separated from one another in what is commonly called a fluidization of the coating material. The charge 2 of powdered coating material in the container 3 is thereby transformed into a continuously fluidized bed which not only behaves substantially like, but appears and feels much like a fluid or liquid, although it is actually simply a dry mixture or combination of the solid particles of coating material and the fluidizing gas. When fluidized, the bed 2 of powdered coating material appears to expand to occupy a greater volume, and the upper surface of the bed 2 of coating material rises to an equilibrium level within the container 3.

The pulverulent coating material 2 may consist of practically any material which has (1) a transient decomposition temperature reasonably higher than its melting temperature, (2) a sintering or melting temperature lower than the melting or decomposition temperature of the material from which the particular articles to be coated are made, and (3) the ability to absorb sufficient heat quickly enough, on momentary contact with a substrate heated to a temperature above the melting or sintering temperature of the coating material, to cause the coating particles to instantaneously become tacky or sticky so as to adhere to the substrate. In general, any of those coating materials referred to in the above-mentioned Gemmer patents, including such materials as organic polymeric thermoplastic resins and organic thermosetting polymers or resins may be suitably employed for the production of coatings in accordance with the process of the invention. Various mixtures of two or more of these materials may also be employed, if desired. In addition, various filler materials such as, for example, any of those mentioned in the above Gemmer patents, may also be added to any of the above coating materials for various purposes, such as to impart desired properties to the powdered coating material or to the final coating, or to reduce the cost thereof.

The coating material 2, in addition to being pulverulent in order to permit the ready fluidizing thereof as explained above, should also be capable of being mixed together with a pulverulent filler or other additive without appreciable packing or cohesion of the particles into larger aggregates. It is also generally desirable that the particle size and density of the coating material and of any additive thereto be sufficiently similar to prevent separation by classification or settling during the fluidizing process. The pulverulent coating material preferably has a particle size of between about .001 inch and about .024 inch. Best results are obtained with a particle size of between .002 inch and about .012 inch.

In the case of the specific application described herein for applying a ring 10, or one or more ring segments, of basing cement to the inside wall or rim 11 of the metal shell 12 of a lamp base 1 as shown in FIG. 3, the pulverulent coating material 2 is comprised of an epoxy resin of the type which can be heated to and maintained in a melted condition for a short period of time, for example, up to one minute or so, without initiating the cure or hardening thereof. The epoxy resin preferably employed is of the so-called one-component type wherein the curing or hardening agent for the epoxy resin is incorporated therein. Examples of such one-component epoxy resins which have been found to be particularly satisfactory for the purposes of the invention are those commercially designated as Bondmaster M640 supplied by the Rubber and Asbestos Corporation, and Hysol 2501 supplied by the Hysol Corporation. A small amount of a suitable powdered filler material, preferably a silica powder such as, for example, that commercially designated as Cab-o-Sil M5 silica made by Godfrey L. Cabot, Inc., of Boston, Massachusetts, is preferably added to and thoroughly admixed with the epoxy resin powder in order to impart a free-flowing characteristic thereto. The percentage of silica powder addition preferably ranges from about 0.1 to about 0.5% by weight of the total admixture. A small amount of a powdered filler material capable of improving the moisture or humidity resistance of the final cured epoxy resin basing cement, without decreasing the initial high bonding strength thereof, is also added to the powdered epoxy resin admixture and thoroughly intermixed therewith. Aluminum powder, for example, that commercially designated as Alcoa #101 aluminum made by the Aluminum Company of America, has been found to be particularly suitable for this purpose. The amount of the aluminum powder addition preferably ranges from about 5 to 10% by weight of the total admixture, although larger amounts ranging up to as high as 20% or so by weight may be employed if desired.

In addition to the arrangement described hereinabove for fluidizing the bed 2 of powdered coating material, the apparatus according to the invention also comprises a funnel-shaped coating applicator nozzle 13 which is disposed in an inverted position within the upper chamber 4 of the container 3 with its funnel-mouth end 14 lowermost and immersed within the fluidized powder bed 2 and its nozzle spout end 15 projecting upwardly above the upper surface 16 of the fluidized powder bed. The applicator nozzle 13 is suitably supported in place within the container 3, as by means of an apertured support flange 17 extending outwardly from the lower or funnel-mouth end 14 of the applicator nozzle and suitably fastened to the wall of the container 3, for example, by being clamped to a shoulder 18 in the container wall, as shown. The support flange 17 is provided with a number of relatively large size apertures or openings 19 therein for permitting free flow or movement of the powdered coating material 2 therethrough from one side of the support flange 17 to its other side.

In the operation of the coating apparatus according to the invention, the pressure of the fluidizing gas or air is adjusted, by means of the control valve 9, so as to effectuate the fluidization of the coating powder bed 2 in the container 3 and, in addition, cause continuous levitation of sufficient numbers of the coating particles within the nozzle 13 upwardly through the nozzle spout 15 of the coating applicator nozzle, by the flow of the gas or air upwardly therethrough, so as to continuously issue from and overflow the upper nozzle end 20 (FIG. 2) of the nozzle spout 15. To assist in the fluidization of the powder bed 2 and the upward flow of the powdered coating material through the applicator nozzle 13 and its nozzle spout 15 so as to issue from the upper nozzle end 20 thereof, the powder bed 2 is preferably subjected to high frequency vibration or agitation by imparting high frequency vibratory movement to the container 3, as by means of a vibrator motor means 21 fixedly attached thereto, as shown. The vibrator motor means 21 may be of any conventional type such as, for example, that commercially known as a Vibrolator in which the vibration is produced by the action of a metal ball driven at high velocity around an eccentric raceway within the vibrator housing by compressed air.

Although for the purposes of the invention it suffices to adjust the powder flow upwardly through the applicator nozzle 13 and nozzle spout 15, by suitable adjustment of the pressure of the gas introduced into the lower chamber 5, so that the powdered coating material just overflows the upper rim end 20 of the applicator nozzle 13, it may if desired be adjusted so that some of the issuing powdered coating material is carried upwardly out the open nozzle end 20 of the coating applicator nozzle. The powdered coating material thus issuing upwardly from the open nozzle end 20 is in such case suitably redirected radially outward in an umbrella-like pattern or flow, as shown at 22 in FIG. 2, by a deflector cap 23 positioned directly above the open upper nozzle end 20 of the applicator nozzle 13. The flow of coating particles issuing from the upper nozzle end 20 is thereby confined to a localized region so as to deposit only on a restricted surface area (e.g., the inside rim) of the hollow article or lamp base 1 to be coated and not on undesired upper surface areas thereof. The deflector cap 23 is supported in place from the coating applicator nozzle 13 so as not to interfere in any way with the placement of the hollow or tubular article 1 to be coated down over the upper end 20 of the coating applicator nozzle 13. For this purpose, the deflector cap 23 may be carried at the upper end of a vertical support rod 24 which extends downwardly through the nozzle spout 15 and is supported at its lower end on a rigid cross member or bar 25 spanning the lower funnel-mouth end 14 of the coating applicator nozzle 13 and rigidly fastened to the lower rim thereof.

In the use of the coating method and apparatus according to the invention, the lamp base or other hollow article 1 to be coated is first preheated to a temperature above the melting or sintering temperature of the coating material 2 at which the particles of the coating material will, on contact with the heated surface of the article, be immediately softened or melted at their interfaces with the heated surface so as to become sticky and adhere thereto. In the case of the particular powdered epoxy resin basing cement compositions referred to hereinabove, the preheat temperature of the lamp base or other article 1 to be coated should be in the range of around 600–650° F. or so. Obviously, the article 1 should not be preheated to the temperature at which it will melt or decompose. The preheated article 1 is then placed down over the upper end 20 of the coating applicator nozzle 13 so that the region of the inside wall of the article on which the powdered coating material is to be deposited (in the particular case illustrated the inside rim 11 of the lamp base 1) is positioned at the level of the flow 22 of powdered coating material issuing from the upper nozzle end 20 of the coating applicator nozzle 13 so as to be contacted thereby. For this purpose, the article 1 to be coated may be held between a pair of spring-loaded holder jaws 26 pivotally mounted on the lower end of a vertically reciprocable support member 27 which is moved down to lower the article into proper coating position over the upper nozzle end 20 of the coating applicator nozzle 13 and then raised, after the necessary period of time required (e.g., around one second or so) to effect the deposition of a ring 10, or one or more ring segments, of the desired amount of powdered coating material on the article. The continued heating of the deposited coating particles by the heat stored in the article 1 then causes the particles to become sintered or melted and to coalesce together to form a smooth and coherent coating 10 of the powdered coating material on the inside wall of the article.

Once the flow of powdered coating material out the upper nozzle end 20 of the coating applicator nozzle 13 has been initiated by proper adjustment of the pressure of the fluidizing gas introduced into the lower chamber 5 of the coating apparatus, the articles 1 to be coated thereafter may be continuously fed in proper preheated condition in rapid succession into the coating apparatus and located for the required predetermined time interval in proper coating position relative to the flow 22 of coating particles issuing from the upper nozzle end 20 of the applicator nozzle 13. Thus, the coating method and apparatus according to the invention provides a simple, rapid and effective way of applying uniform and closely controlled amounts of powdered coating material, such as a ring 10 or one or more ring segments of powdered epoxy resin basing cement, to any desired localized region of the inside wall of lamp bases or other hollow articles 1. During the operation of the coating apparatus, the excess coating material in the flow 22 which does not deposit on and adhere to the lamp base or other article 1 simply drops down along the outside of the applicator nozzle 13 back into the bed 2 of powdered coating material in the container 3. For proper operation of the coating apparatus, the level of the powder bed 2 must be maintained above the lower funnel-mouth end 14 of the coating applicator nozzle 13 so that the latter is immersed in the powder bed 2 at all times during the continuance of the coating operation. The thickness of the coating 10 can be accurately controlled by regulation of the preheating temperature of the article 1 as well as by regulation of the time interval during which the article is inserted in the flow 22 of coating particles issuing from the upper nozzle end 20 of the coating applicator nozzle 13. The higher the preheat temperature of the article 1, or the longer the article is inserted in the coating particle flow 22, the greater will be the quantity of coating particles which will adhere to the article and the thicker will be the final coating 10.

Where it is desired to apply the powdered coating material to the inside wall of the article 1 in the form of one or more ring segments or arcuate sections instead of a continuous annular ring, the upper nozzle end 20 of the coating applicator nozzle 13 may in such case be of the modified notched construction shown in FIG. 4 wherein it is formed with one or more upstanding arcuate extensions 28 which serve as shields or barriers to block off the horizontally outward flow of powder coating material out those regions around the peripheral extent of the nozzle spout end 20 where the said extensions 28 are located. Alternatively, where the top deflector plate 23 is employed, these arcuate barriers or shields 28 may be formed instead as depending projections on the deflector plate 23 which abut against the upper rim end 20 of the coating applicator nozzle 13.

What I claim as new and desire to secure by Letters Patent of the United States is:

1. Apparatus for coating the inside of a hollow article having an open end with a powdered coating material, said apparatus comprising an open top container having a horizontally disposed porous bed plate for supporting a bed of the powdered coating material in said container, a funnel-shaped applicator nozzle disposed in inverted position within said container with its lower funnel-mouth end immersed in the said powder bed and its open upper nozzle-spout end projecting upwardly above the top surface of the powder bed, holder means separate from and mounted adjacent the upper end of said container for supporting the hollow article in heated condition within the open top of the container in spaced relation to the walls thereof and positioned with its open end down and around but spaced from the said nozzle end, a top deflector cap member overlying the open upper nozzle-spout end of said applicator nozzle but closely spaced therefrom adapted to redirect coating particles issuing upwardly out of the said upper nozzle end onto localized regions of the hollow heated article, and means for supplying pressurized gas upwardly through the said porous bed plate at a pressure effective to fluidize the said powder bed and carry a continuous stream of coating particles upwardly therefrom through said applicator nozzle and issuing from the upper nozzle end thereof in the form of a concentrated stream of the particles continuously overflowing the said nozzle end so as to impinge against the inside wall of the hollow heated article positioned therearound and cause deposition of the coating particles onto a localized region of and instantaneous sintering thereof to the heated inside wall of said article.

2. Apparatus for coating the inside of a tubular article having an open end with a ring of a powdered coating material, said apparatus comprising an open top container, a horizontally disposed porous partition dividing said container into upper and lower chambers and adapted to support a bed of the powdered coating material thereon, a funnel-shaped applicator nozzle disposed in inverted position within said upper chamber with its lower funnel-mouth end immersed in the said powder bed and its open upper nozzle-spout end projecting upwardly above the top surface of the powder bed, holder means separate from and mounted adjacent the upper end of said container for supporting the tubular article in heated condition within the open top of the container in spaced relation to the walls thereof and positioned with its open end down and around but spaced from the said nozzle end, a top deflector cap member overlying the open upper nozzle-spout end of said applicator nozzle but closely spaced therefrom adapted to redirect coating particles issuing upwardly out the said upper nozzle end onto localized regions of the hollow article, and means for introducing pressurized gas into said lower chamber for passage upwardly through said partition at a pressure effective to fluidize the said powder bed and carry a continuous stream of coating particles upwardly therefrom through said applicator nozzle and issuing from the upper nozzle end thereof in the form of a concentrated stream of the particles continuously overflowing the said nozzle end substantially completely therearound so as to impinge against the inside wall of the tubular heated article positioned around the said upper nozzle end and cause deposition of a ring of the coating particles onto and instantaneous sintering thereof to the inside wall of said article.

3. Apparatus as specified in claim 1 and comprising, in addition, vibrator motor means connected with said container for imparting high-frequency vibratory movement thereto.

4. Apparatus as specified in claim 1 wherein the said top deflector cap member is supported solely from the said applicator nozzle by support means thereon extending upwardly through the passageway of said nozzle.

5. Apparatus as specified in claim 1 wherein the said holder means is vertically movable relative to said container downwardly into the said open top thereof for supporting the article to be coated and lowering it into coating position over the said upper nozzle end of the applicator nozzle.

6. Apparatus as specified in claim 1 wherein the said applicator nozzle is provided with an outward perforate support flange having a plurality of relatively large size apertures therethrough and rigidly fastened to the side wall of said container for supporting the said nozzle therefrom.

7. Apparatus as specified in claim 1 and including spaced arcuate barriers attached and extending down from the top deflector cap to the upper rim end of the nozzle closing off portions of the annular extent of the outlet opening between the said cap and the upper end of said nozzle, thereby allowing powdered coating material to be deposited on the interior of the article in discontinuous ring segments instead of, in a continuous annular ring.

References Cited

UNITED STATES PATENTS

| | | | |
|---|---|---|---|
| 1,830,598 | 11/1931 | Fagan | 117—18 |
| 2,303,088 | 11/1942 | Perkins | 118—306 |
| 2,336,946 | 12/1943 | Marden et al. | 117—18 X |
| 2,498,405 | 2/1950 | Fader. | |
| 2,561,393 | 7/1951 | Marshall. | |
| 2,739,424 | 3/1956 | Fritze | 118—306 X |
| 2,750,681 | 6/1956 | Berry. | |
| 2,815,550 | 12/1957 | Valyi. | |
| 2,844,489 | 7/1958 | Gemmer | 117—21 X |
| 2,859,728 | 11/1958 | Hoedy | 118—306 |
| 3,040,439 | 6/1962 | Frost | 117—18 |
| 3,063,860 | 11/1962 | Gemmer | 117—18 |
| 3,090,696 | 5/1963 | Gemmer | 117—21 |
| 3,254,625 | 6/1966 | Armstrong | 117—21 X |
| 3,291,631 | 12/1966 | Smith | 117—19 |

FOREIGN PATENTS 1,005,413    3/1957    Germany.

WILLIAM D. MARTIN, *Primary Examiner.*

P. ATTAGUILE, *Assistant Examiner.*